United States Patent
Ball et al.

(10) Patent No.: US 11,498,547 B2
(45) Date of Patent: Nov. 15, 2022

(54) HYBRID VEHICLE CONTROL SYSTEM

(71) Applicant: FORD GLOBAL TECHNOLOGIES, LLC, Dearborn, MI (US)

(72) Inventors: Edward Ball, London (GB); David Cox, London (GB); Matthew Mitchell, Rugeley (GB); David Hesketh, Stock (GB); Jonathan Thombs, Danbury (GB); David Ramiro Garcia, Richmond (GB)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 16/938,293

(22) Filed: Jul. 24, 2020

(65) Prior Publication Data

US 2022/0024442 A1 Jan. 27, 2022

(51) Int. Cl.

| | |
|---|---|
| G06F 1/26 | (2006.01) |
| B60W 20/15 | (2016.01) |
| B60W 10/06 | (2006.01) |
| B60W 10/08 | (2006.01) |
| F01N 3/20 | (2006.01) |
| B60R 16/03 | (2006.01) |
| B60W 10/30 | (2006.01) |
| H02P 27/06 | (2006.01) |
| B60L 50/16 | (2019.01) |

(52) U.S. Cl.
CPC ............. *B60W 20/15* (2016.01); *B60R 16/03* (2013.01); *B60W 10/06* (2013.01); *B60W 10/08* (2013.01); *B60W 10/30* (2013.01); *F01N 3/2013* (2013.01); *B60L 50/16* (2019.02); *H02P 27/06* (2013.01)

(58) Field of Classification Search
CPC ...... B60W 20/15; B60W 10/06; B60W 10/08; B60W 10/30; B60R 16/03; F01N 3/2013; H02P 27/06
See application file for complete search history.

(56) References Cited

U.S. PATENT DOCUMENTS

| | | | | |
|---|---|---|---|---|
| 5,257,501 | A | * | 11/1993 | Wataya ..................... F01N 9/00 219/205 |
| 7,383,902 | B2 | * | 6/2008 | Matsuzaki ............ B60L 3/0023 903/906 |
| 9,438,113 | B2 | * | 9/2016 | Wyatt ...................... B60L 58/14 |
| 2006/0066287 | A1 | | 3/2006 | Obayashi et al. |
| 2010/0070120 | A1 | | 3/2010 | Bailey et al. |

* cited by examiner

*Primary Examiner* — Gonzalo Laguarda
(74) *Attorney, Agent, or Firm* — David B Kelley; Brooks Kushman P.C.

(57) ABSTRACT

A vehicle includes an internal combustion engine, an electric machine, and a controller. The electric machine is rotatably coupled to the engine and is configured to deliver electrical power to electrical accessories. The controller is programmed to, in response to a control signal loss between the electric machine and the controller, limit torque output of electric machine to less than a torque threshold that corresponds to the power threshold. The controller is further programmed to, in response an accessory power demand being greater than the power threshold, control the engine to power the electric machine to increase the torque output of electric machine to greater than the torque threshold to meet the accessory power demand.

20 Claims, 2 Drawing Sheets

HYBRID VEHICLE CONTROL SYSTEM

TECHNICAL FIELD

The present disclosure relates to control systems for hybrid vehicles and electric machines that are utilized in hybrid vehicles.

BACKGROUND

Hybrid vehicles may include an electric machine that is configured to propel the vehicle, recharge a battery, and/or power various subsystems of the vehicle.

SUMMARY

A vehicle includes an internal combustion engine, an electric machine, and a controller. The electric machine is rotatably coupled to the engine and is configured to deliver electrical power to primary and secondary electrical accessories. The controller is programmed to, control the electrical machine to adjust a torque being delivered from the engine to the electric machine. The controller is further programmed to, in response to a torque signal loss between the electric machine and the controller, limit electric machine torque to less than a threshold; control the engine to power the electric machine to supply an electrical voltage to the primary accessories; calculate an estimated torque being delivered from the engine to the electric machine based on a present voltage being delivered to the primary and secondary accessories, a present electrical current being delivered to the primary and secondary accessories, and a rotational speed of the engine; calculate a desired torque of the electric machine based on the present voltage and a desired electrical power of the primary and secondary accessories; and in response to the desired torque being greater than the threshold, control the engine to power the electric machine to increase and drive the estimated torque of the electric machine toward the desired torque to meet the electrical power demand of the primary and secondary accessories.

A vehicle includes an internal combustion engine, an electric machine, and a controller. The electric machine is rotatably coupled to the engine and is configured to deliver electrical power to electrical accessories. The controller is programmed to, in response to a control signal loss between the electric machine and the controller, limit torque output of electric machine to less than a torque threshold that corresponds to the power threshold. The controller is further programmed to, in response an accessory power demand being greater than the power threshold, control the engine to power the electric machine to increase torque output of electric machine to greater than the torque threshold to meet the accessory power demand. The controller is further programmed to, in response to presence of the control signal, drive the torque output of the electric machine toward a desired torque regardless of the accessory power demand.

A power control system includes an internal combustion engine, an electric machine, and a controller. The electric machine is configured to deliver electrical power to a first electrical subcomponent and a second electrical subcomponent. The internal combustion engine is configured to deliver power to the electric machine. The controller is programmed to, control the electrical machine to adjust a torque being delivered from the engine to the electric machine. The controller is further programmed to, in response to a torque signal loss between the electric machine and the controller, limit electric machine torque to less than a threshold; control the engine to power the electric machine to supply an electrical voltage to the first and second subcomponents; calculate an estimated torque being delivered from the engine to the electric machine based on the voltage being delivered to the first and second subcomponents, an electrical current being delivered to the first and second subcomponents, and a rotational speed of the engine; calculate a desired torque of the electric machine based on the voltage and a desired electrical power of the first and second subcomponents; and in response to the desired torque being greater than the threshold, control the engine to power the electric machine to increase and drive the estimated torque of the electric machine to toward the desired torque meet the electrical power demand of the first and second subcomponents.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
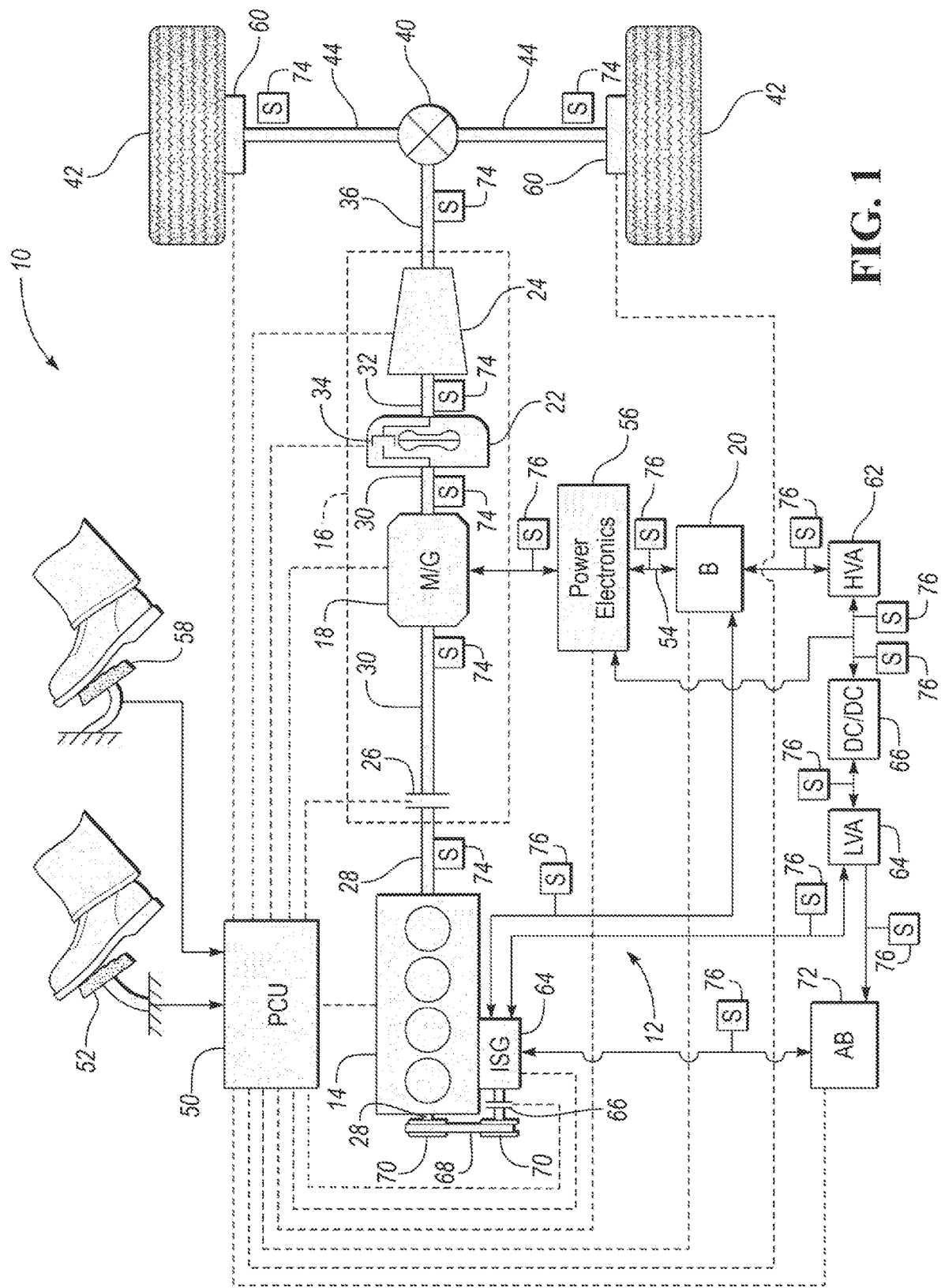
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include inverting circuitry, for example. The inverting circuitry of the power electronics 56 convert DC power from the battery 20 into AC power to be used by the M/G 18. The controller 50 may command the power electronics 56 to convert voltage from the battery 20 to an AC voltage provided to the M/G 18 to provide positive or negative torque to the shaft 30. This operation mode may be referred to as an "electric only" or "EV" operation mode. The M/G 18 transmits stored electrical energy through wiring 54 to power electronics 56 that may include inverting circuitry, for example.

In any mode of operation, the M/G 18 may act as a motor and provide a driving force for the powertrain 12. Alternatively, the M/G 18 may act as a generator and convert kinetic energy from the powertrain 12 into electric energy that may be stored in the battery 20 or may be utilized by other vehicle subsystems, subcomponents, or accessories (described in further detail below). The power electronics 56 may include rectifying circuitry that converts the AC power from the M/G 18 into DC power that may be stored in the battery 20 or utilized by other vehicle subsystems, subcomponents, or accessories. The controller 50 may command the power electronics 56 to convert AC voltage from the M/G 18 to a DC voltage that is provided to the battery 20 or the other vehicle subsystems, subcomponents, or accessories. The M/G 18 may act as a generator while the engine 14 is providing propulsion power for the vehicle 10, for example. The M/G 18 may also act as a generator while the engine 14 is providing power to the M/G 18 alone (i.e., the engine 14 may provide power to the M/G 18 while not providing power to propel the vehicle 10). The M/G 18 may additionally act as a generator during times of regenerative braking in which torque and rotational energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more high-voltage vehicle subcomponents or accessories 62 via the power electronics 56. The high-voltage vehicle subcomponents or accessories may include, but are not limited to, an electric heater that is configured to heat a catalytic converter of an exhaust system of the engine, an electric air compressor of a supercharger that is configured to increase the power output of the engine 14, or one or more sub controllers that may form controller 50. The battery 20 and the M/G 18 may also be configured to provide electrical power to one or more low-voltage vehicle subcomponents or accessories 64 via the power electronics 56 and a DC to DC converter 66. The low-voltage vehicle subcomponents or accessories may include, but are not limited to, cabin heating and cooling systems, lights, entertainment systems (radios or display screens), one or more sub controllers that may form controller 50, the ignition system of the engine 14 (i.e., the spark plugs and the electrical delivery system to the spark plugs), the fuel pump and fuel delivery system to the engine, seat heating or cooling systems. The low-voltage accessories 64 are connected to an electrical grid or bus (i.e., a low-voltage bus) that has a lower voltage relative to an electrical grid or bus (i.e., a high-voltage bus) that the high-voltage vehicle accessories 62 are connected to.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the high-voltage accessories 62 and/or the low-voltage vehicle accessories 64 when operating as a generator. The accessory battery 72 may also be configured to power the high-voltage vehicle accessories 62 or the low-voltage vehicle accessories 64. Additional DC to DC converters (not shown) may be utilized when transferring power from either the ISG 64 or the accessory battery 72 to Battery 20 or the high-voltage vehicle accessories 62. Power may also be directed from the ISG 64 or the accessory battery 72 to the M/G 18 via the power electronics.

Some of the vehicle's subcomponents, including some the high-voltage subcomponents or accessories 62 and/or some of the low-voltage vehicle subcomponents or accessories 64, may be deemed essential and must be functioning in order for the vehicle to properly operate or to ensure the vehicle meets desired standards or regulations. For example, the engine 14 will not operate unless the ignition system of the engine 14 system and the fuel delivery system, including the fuel pump, is operating. As another example, the heater for the catalytic converter of the engine exhaust system may need to stay operational in order to ensure the catalytic converter is quickly heated and remains at an efficient operating temperature. As yet another example, the electric compressor of a supercharger may need to remain operational in order to assist in quickly bringing the engine and/or the catalytic converter to operating temperature. Such essential components may be referred to as primary accessories and may include, but are not limited to, one or more sub controllers that may form controller 50, the ignition system of the engine 14 (i.e., the spark plugs and the electrical delivery system to the spark plugs), the fuel pump and fuel delivery system to the engine 14, a heater for the catalytic converter, an electric air compressor of a supercharger for the engine 14, the DC to DC converter, and the circuitry of the power electronics 56. It should be noted that the DC to DC converter and the circuitry of the power electronics may be connected to the same high-voltage electrical grid or bus that the high-voltage vehicle accessories 62 are connected to.

Some of the vehicle's subcomponents, including some the high-voltage subcomponents or accessories 62 and/or some of the low-voltage vehicle subcomponents or accessories 64, may not be essential in order for the vehicle to properly operate or to ensure the vehicle meets desired standards or regulations. Such non-essential components may be referred to as secondary accessories and may include, but are not limited to, cabin heating and cooling systems, lights, entertainment systems (radios or display screens), one or more sub controllers that may form controller 50, seat heating or cooling systems, etc.

The vehicle 10 may include one or more rotational speed and/or torque sensors 74 that are configured to communicate the torque at various points along the powertrain 12 back to the controller. For example, the rotational speed and/or torque of the engine 14, the rotational speed and/or torque of the M/G 18, the rotational speed and/or torque at the input of the torque converter 22, the rotational speed and/or torque at the output of the torque converter 22 and input to the gearbox 24, the rotational speed and/or torque at the output of the gearbox 24 and input to the differential 40, and rotational speeds and/or the torques of the half shafts 44 and the wheels 42 may all be measured via rotational speed and/or torque sensors 74 and communicated back to the controller 50. It should be noted that the communication input and output lines (i.e., the dotted lines) between the rotational speed and/or torque sensors 74 and the controller 50 have been omitted in FIG. 1 to simplify the image. However, this disclosure should be construed to include such communication input and outlines event though they have been omitted in the FIG. 1.

The vehicle 10 may also include one more electrical voltage and/or electrical current sensors 76 that are configured to measure various electrical voltages and/or electrical currents at various places along the electrical system of the vehicle. For example, the electrical voltage and/or current being delivered to the power electronics 56 from the M/G 18; the electrical voltage and/or current being delivered to battery 20 from the M/G 18 via the power electronics 56; the electrical voltage and/or current being delivered to the high-voltage subcomponents or accessories 62 from the M/G 18 via the power electronics 56; the electrical voltage and/or current being delivered to DC to DC converter from the M/G 18; the electrical voltage and/or current being delivered to the low-voltage subcomponents or accessories 64 from the M/G 18 via the power electronics 56 and DC to DC converter; or the electrical voltage and/or current being delivered to any of the components from the battery 20, the ISG 64, or the accessory battery 72 via any of the power paths illustrated in FIG. 1 may be measured via electrical voltage and/or electrical current sensors 76 and communicated back to the controller 50. It should be noted that the communication input and output lines (i.e., the dotted lines) between the electrical voltage and/or electrical current sensors 76 and the controller 50 have been omitted in FIG. 1 to simplify the image. However, this disclosure should be construed to include such communication input and outlines event though they have been omitted in the FIG. 1.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), or any other hybrid vehicle configuration known to a person of ordinary skill in the art.

Figure 2:
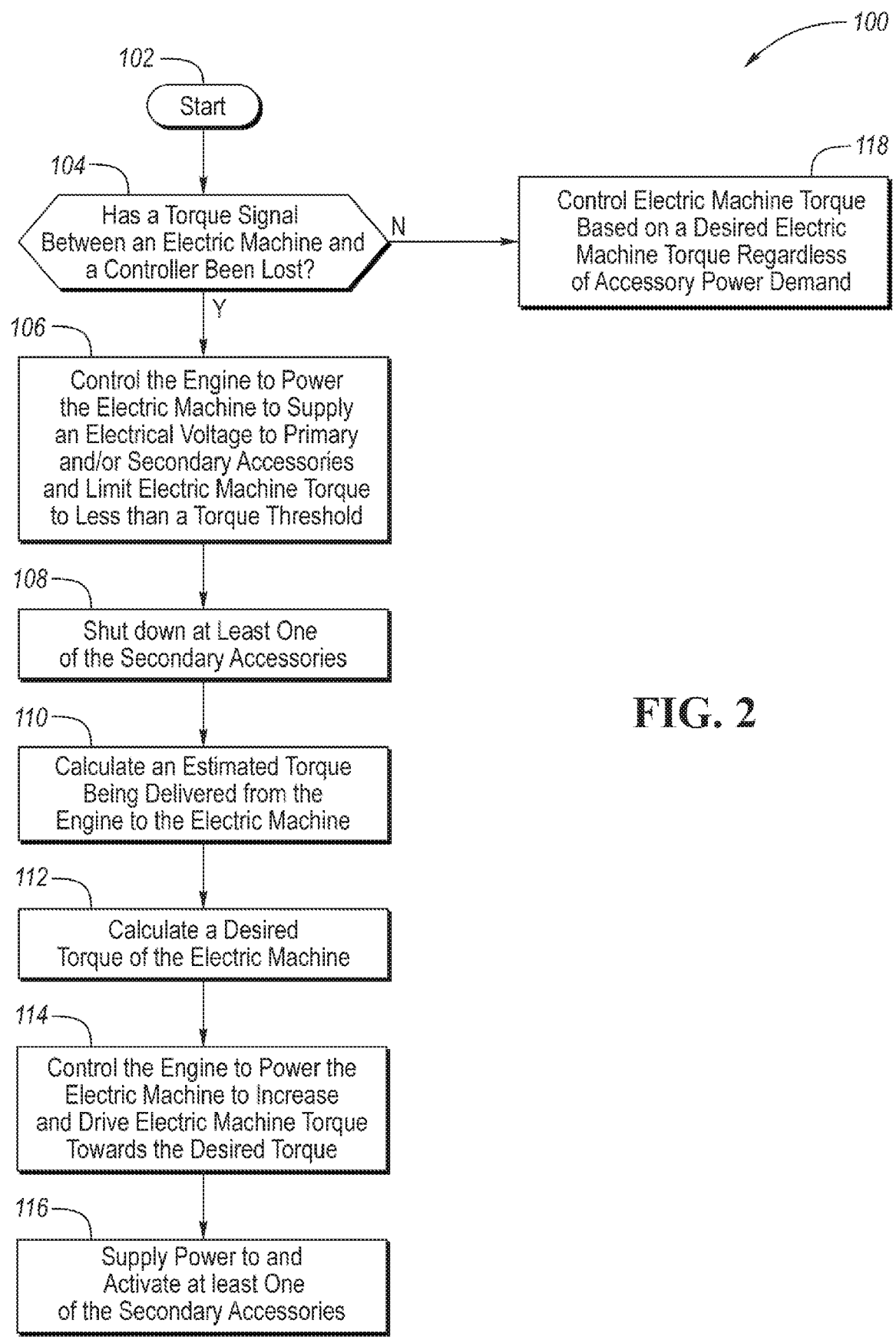
FIG. 2 is a flowchart illustrating a method for controlling the torque output of the electric machine.

Referring to FIG. 2, a flowchart illustrating a method 100 for controlling the torque output of an electric machine (e.g., M/G 18) is illustrated. The method 100 may be stored as control logic and/or an algorithm within the controller 50. The method 100 begins at start block 102. The method 100 then moves on to block 104 where it is determined if a signal between an electric machine (e.g., M/G 18) and a controller (e.g., controller 50) that is indicative of a torque of the electric machine has been lost. The torque signal may be delivered to the controller via a torque sensor (e.g., sensor 74). If the torque signal has been lost, the method 100 moves on to block 106, where the controller transitions to a mode to control the engine to power the electric machine to supply an electrical voltage to the primary and/or secondary subcomponents or accessories (e.g., see primary and secondary subcomponents or accessories listed above). The voltage and current being delivered to the primary and/or secondary subcomponents or accessories may be measured via sensors (e.g., sensors 76).

Also, at block 106 the torque of the electric machine is limited to less than an upper limit or threshold. In the voltage control mode at block 106, the torque of electric machine may be difficult to control without a direct torque signal from the electric machine. Therefore, the torque output of the electric machine is limited so that the torque of the electric machine does not cause sudden changes in the torque of the drivetrain of the vehicle. Under such a circumstance, the engine (e.g., engine 14) will provide the majority of the power to drivetrain. Also, once the torque of the electric machine has been limited, at least one of the secondary accessories may be shutdown at block 108 to ensure that sufficient power is being delivered to the primary accessories from the electric machine.

Although the torque of electric machine may be difficult to control without a direct torque signal, the torque of the electric machine, and more specifically a torque being delivered from the engine to the electric machine, may be estimated at block 110 based on the electrical power flowing into the primary and secondary accessories from the electric machine and the rotational speed of the engine, which may be represented by equation (1):

$$P=T*\omega*R*\eta=\eta*I*V \quad (1)$$

where P represents the power flowing into the primary and secondary accessories from the electric machine and/or the power flowing from the engine to the electric machine, T is the torque of the electric machine, R is gear or pulley ratio between the engine and the electric machine (if there is gearing or a pulley connection between the engine and the electric machine; R will have a value of one if there is a direction connection between the rotor shaft of the electric machine and the crankshaft of the engine), $\eta$ is the efficiency of the energy transfer between the engine and the electric machine, I is the electrical current being delivered to the primary and/or secondary accessories from the electric machine, and V is the voltage being delivered to the primary and/or secondary accessories from the electric machine.

Next, the method moves onto block 112, where a desired torque of the electric machine is determined utilizing equation (1) based on the demanded or desired power to operate the primary and secondary accessories (the demanded or desired power to operate the primary and secondary accessories being a product of a desired voltage and a desired current to operate the primary and secondary accessories) and a current rotational speed of the engine.

The method 100 then moves on to block 114, where the engine is controlled to power the electric machine to increase the estimated torque of the electric machine (determined at block 110) to greater than the upper limit or threshold of the torque of the electric machine (determined at block 106) and to drive the estimated torque of the electric machine toward the desired torque of the electric machine (determined at block 112) in order to meet the demanded or desired power to operate the primary and secondary accessories. The method 100 then moves on to block 116 where the at least one of the secondary accessories that were shutdown at block 108 are reactivated and the electric machine is configured to supply power to operate the at least one of the secondary accessories that were shutdown at block 108.

Returning to block 104, if the torque signal was not lost, the method 100 moves on to block 118, where the torque of the electric machine is controlled and driven toward a desired torque regardless of the demanded or desired power to operate the primary and secondary accessories. It should be understood that the flowchart in FIG. 2 is for illustrative purposes only and that the method 100 should not be construed as limited to the flowchart in FIG. 2. Some of the steps of the method 100 may be rearranged while others may be omitted entirely. Furthermore, it should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an internal combustion engine;
    an electric machine rotatably coupled to the engine and configured to deliver electrical power to primary and secondary electrical accessories;
    a sensor (i) disposed along an output shaft of the electric machine and (ii) configured to measure a torque output of the electric machine at the output shaft; and
    a controller programmed to,
        receive a signal from the sensor indicative of the measured torque output of the electric machine,
        control the electrical machine based on the signal, and
        in response to a loss of the signal,
            initially control the engine to power the electric machine at an estimated torque that is less than a threshold, to supply an electrical voltage to the primary, accessories that is less than a voltage required to generate a demanded electrical power of the primary and secondary accessories,
            calculate the estimated torque being delivered from the engine to the electric machine based on a present voltage being delivered to the primary and secondary accessories, a present electrical current being delivered to the primary and secondary accessories, and a rotational speed of the engine,
            calculate a desired torque of the electric machine based on the present voltage and the demanded electrical power of the primary and secondary accessories, and
            in response to the desired torque being greater than the threshold and subsequently to controlling the engine to power electric machine at the estimated torque that is less than the threshold, control the engine to power the electric machine to increase and drive the estimated torque of the electric machine toward the desired torque to meet the electrical power demand of the primary and secondary accessories.

2. The vehicle of claim 1, wherein the controller is further programmed to, in response to the loss of the signal, shut down at least one of the secondary accessories.

3. The vehicle of claim 2, wherein the controller is further programmed to, in response to increasing the estimated torque and subsequently to controlling the engine to power electric machine at the estimated torque that is less than the threshold, supply electrical power to and activate the at least one of the secondary accessories.

4. The vehicle of claim 1, wherein one of the primary accessories is an electrical heater this configured to heat a catalytic converter.

5. The vehicle of claim 1, wherein one of the primary accessories is a turbo charger compressor.

6. The vehicle of claim 1, wherein one of the primary accessories is an inverter that is configured to transfer electrical power between the electric machine and a battery.

7. The vehicle of claim 1, wherein one of the primary accessories is a DC to DC converter that is configured to transfer electrical power between a first bus and a second bus.

8. The vehicle of claim 1, wherein the one of the secondary accessories is a radio.

9. The vehicle of claim 1, wherein the one of the secondary accessories is a vehicle HVAC system.

10. A vehicle comprising:
    an internal combustion engine;
    an electric machine rotatably coupled to the engine and configured to deliver electrical power to electrical accessories;
    a sensor (i) disposed along an output shaft of the electric machine and (ii) configured to measure a torque output of the electric machine at the output shaft; and
    a controller programmed to,
        receive a signal from the sensor indicative of the measured torque output of the electric machine,
        control the electrical machine based on the signal,
        in response to a loss of the signal, initially control the engine to power the electric machine at a torque that is less than a torque threshold that corresponds to a power threshold, wherein the power threshold is less than an accessory power demand,
        subsequently to controlling the engine to power the electric machine at the torque that is less than the threshold, control the engine to power the electric machine to increase the torque output of electric machine to greater than the torque threshold to meet the accessory power demand, and
        in response to presence of the control signal, drive the torque output of the electric machine toward a desired torque regardless of the accessory power demand.

11. The vehicle of claim 10, wherein the controller is further programmed to, in response to the loss of the signal, shut down at least one of the accessories.

12. The vehicle of claim 11, wherein the controller is further programmed to, in response to driving the torque of the electric machine toward the desired torque and subsequently to controlling the engine to power electric machine at the torque that is less than the threshold, supply electrical power to and activate the at least one of the accessories.

13. The vehicle of claim 10, wherein one of the accessories is an electrical heater this configured to heat a catalytic converter.

14. The vehicle of claim 10, wherein one of the accessories is a turbo charger compressor.

15. The vehicle of claim 10, wherein one of the accessories is an inverter that is configured to transfer electrical power between the electric machine and a battery.

16. The vehicle of claim 10, wherein one of the accessories is a DC to DC converter that is configured to transfer electrical power between a first bus and a second bus.

17. The vehicle of claim 10, wherein the one of the accessories is a radio.

18. The vehicle of claim 10, wherein the one of the accessories is a vehicle HVAC system.

19. A power control system comprising:
- an electric machine configured to deliver electrical power to a first electrical subcomponent and a second electrical subcomponent;
- an internal combustion engine configured to deliver power to the electric machine;
- a sensor (i) disposed along an output shaft of the electric machine and (ii) configured to measure a torque output of the electric machine at the output shaft; and
- a controller programmed to,
  - receive a signal from the sensor indicative of the measured torque output of the electric machine,
  - control the electrical machine based on the signal, and
  - in response to a loss of the signal,
    - initially control the engine to power the electric machine at an estimated torque that is less than a threshold to supply an electrical voltage to the first and second subcomponents, that is less than a voltage required to generate a demanded electrical power of the first and second subcomponents,
    - calculate the estimated torque being delivered from the engine to the electric machine based on the voltage being delivered to the first and second subcomponents, an electrical current being delivered to the first and second subcomponents, and a rotational speed of the engine,
    - calculate a desired torque of the electric machine based on the voltage and the demanded electrical power of the first and second subcomponents, and
    - in response to the desired torque being greater than the threshold and subsequently to controlling the engine to power the electric machine at the estimated torque that is less than the threshold, control the engine to power the electric machine to increase and drive the estimated torque of the electric machine to toward the desired torque meet the electrical power demand of the first and second subcomponents.

20. The power control system of claim 19, wherein the controller is further programmed to,
- in response to the loss of the signal, shut down the second subcomponent, and
- in response to increasing the estimated torque and subsequently to controlling the engine to power the electric machine at the estimated torque that is less than the threshold, supply electrical power to and activate the second subcomponent.

* * * * *